United States Patent [19]

Larkins, Jr.

[11] 4,048,798

[45] Sept. 20, 1977

[54] SUCTION POWER-DRIVEN AIR TURBINE

[76] Inventor: John S. Larkins, Jr., Mountain Valley Farm, Star Rte. No. 5, Box 60, New Castle, Va. 24127

[21] Appl. No.: 631,040

[22] Filed: Nov. 12, 1975

Related U.S. Application Data

[63] Continuation-in-part of Ser. No. 618,623, Oct. 1, 1975, abandoned.

[51] Int. Cl.² .............................................. F15B 15/18
[52] U.S. Cl. ..................................... 60/407; 417/174; 415/81
[58] Field of Search ................... 417/161, 159, 174; 415/81, 147; 60/39.75, 407, 409, 411, 412, 397; 416/189; 110/8 A

[56] References Cited

U.S. PATENT DOCUMENTS

| 379,512 | 3/1888 | Fulton | 416/189 |
|---|---|---|---|
| 643,938 | 2/1900 | Brady | 415/64 |
| 650,355 | 5/1900 | Hesse | 60/412 |
| 1,148,711 | 8/1915 | Nourse | 60/407 |
| 1,291,322 | 1/1919 | Wiberg | 415/64 |
| 1,331,313 | 2/1920 | Bonom | 415/64 |
| 1,960,810 | 5/1934 | Gordon | 60/39.35 |
| 2,306,727 | 12/1942 | Hill | 417/174 |
| 2,378,425 | 6/1945 | Murray | 417/174 |
| 3,355,254 | 11/1967 | Hoskinson | 110/8 A |
| 3,556,675 | 1/1971 | Howard et al. | 416/189 |
| 3,572,265 | 3/1971 | Stockman | 110/8 A |

FOREIGN PATENT DOCUMENTS

| 908,734 | 3/1954 | Germany | 60/397 |
|---|---|---|---|
| 269,984 | 12/1929 | Italy | 60/397 |

Primary Examiner—Carlton R. Croyle
Assistant Examiner—Thomas I. Ross
Attorney, Agent, or Firm—Harry R. Dumont

[57] ABSTRACT

An engine which includes a combustion chamber and a work function chamber enclosing the combustion chamber. A burner means is located in the combustion chamber for combustion. A rotatable turbine wheel is further mounted in an inlet of the work function chamber with one side of the blades in communication with the ambient atmosphere and the other side in communication with the interior of the work function chamber. The products of combustion are rapidly cooled and continuously removed from the combustion chamber by an exhaust means of the venturi type. This serves to create a pressure differential and provide a continuous stream of high velocity airflow against and through the blades of the turbine, through the work function chamber and out through the exhaust means. In this manner, a rapid rotative movement is provided for the turbine wheel and power output is taken from it and from the output shaft on which it is mounted. In one modification of the invention a pair of opposed turbine wheels are used in a manner to double the power output.

25 Claims, 18 Drawing Figures

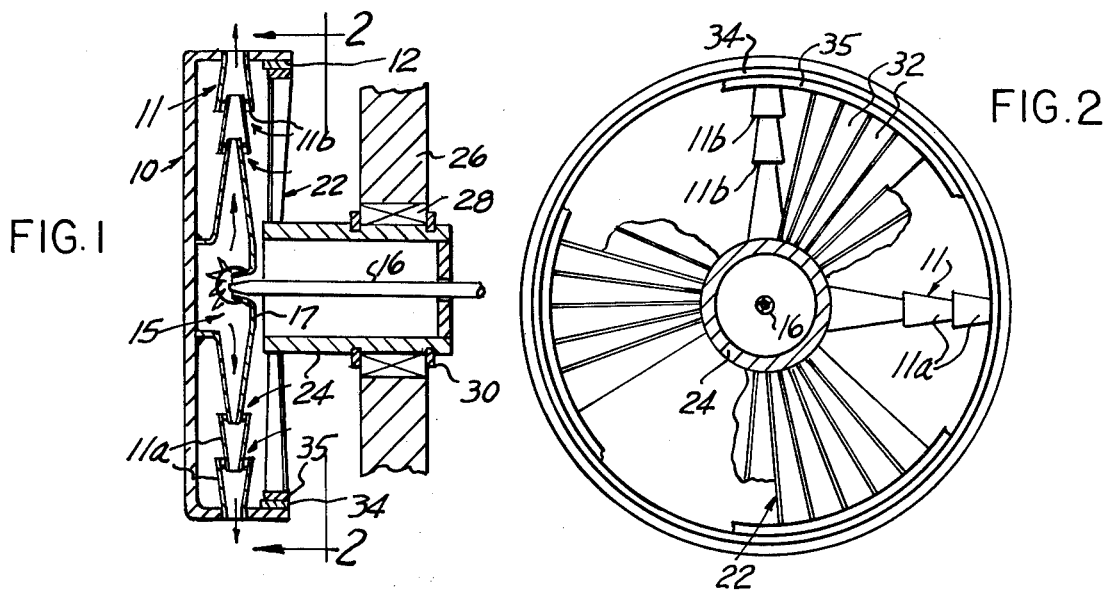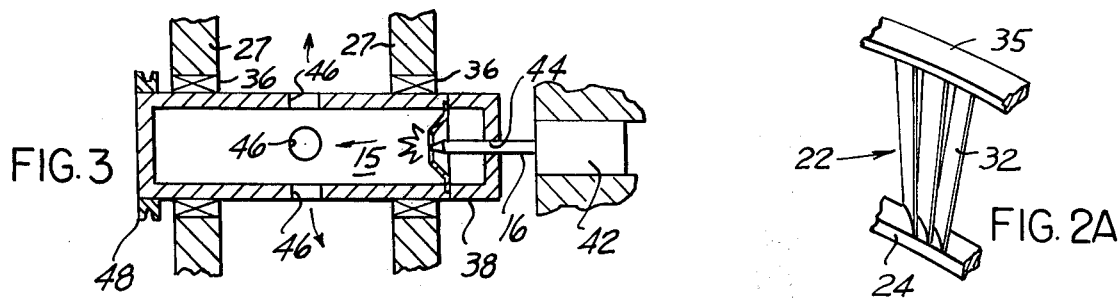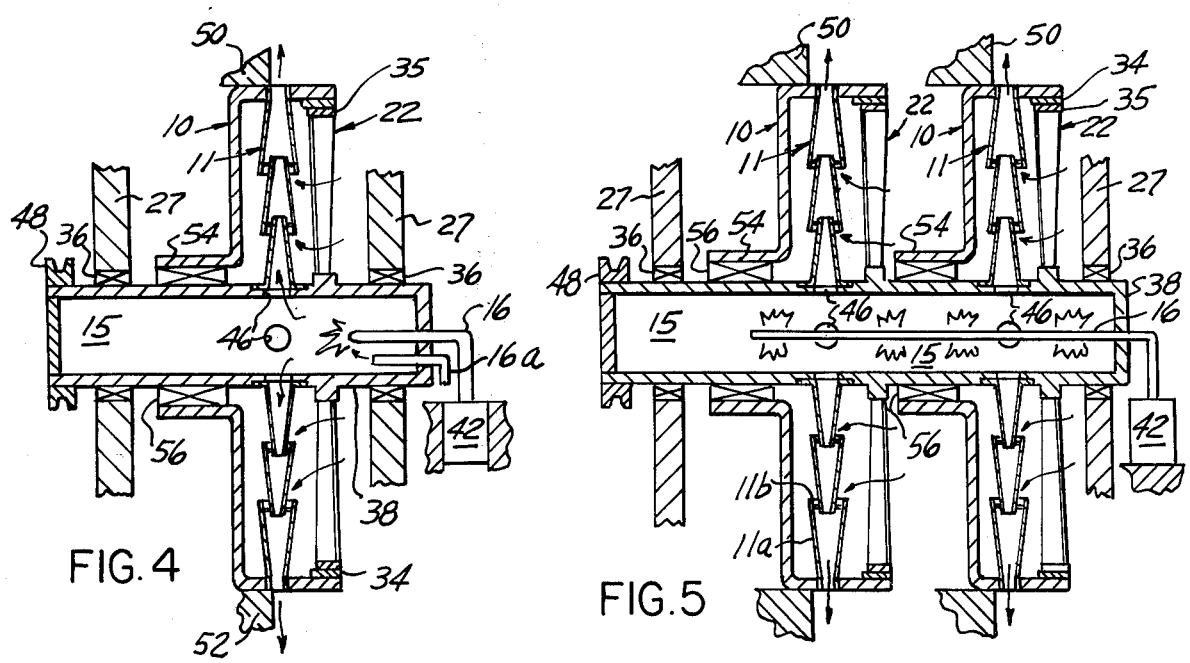

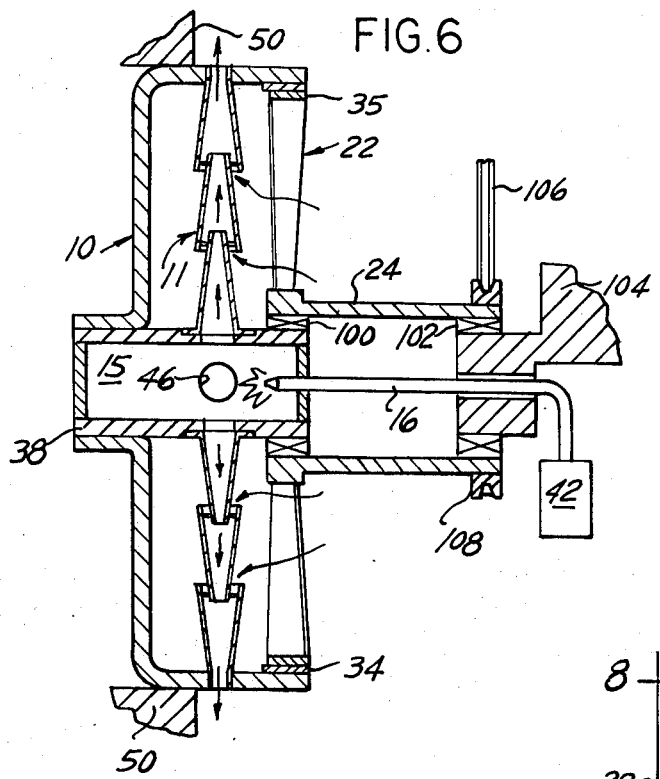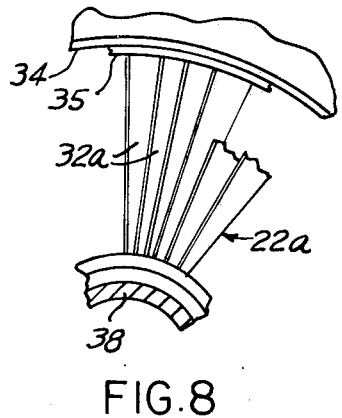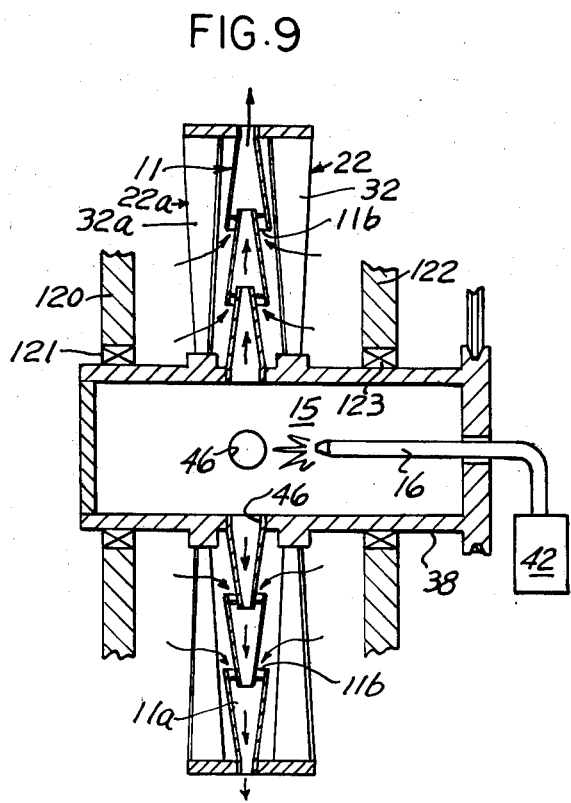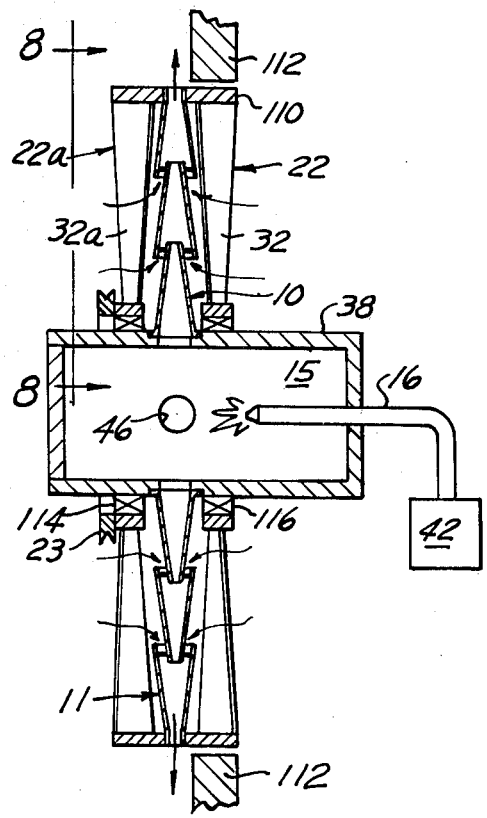

SUCTION POWER-DRIVEN AIR TURBINE

REFERENCE TO RELATED APPLICATION

This application is a continuation-in-part of my copending application Ser. No. 618,623, filed Oct. 1, 1975, for "Pressure Differential Engine," now abandoned.

BACKGROUND OF THE INVENTION

This invention is related to a new type of engine in which, while combustion is provided, the heated air itself is not relied upon to directly supply energy for the engine. The heated airflow through the venturi causes airflow from ambient through the turbine wheel to cause rotation. It is well known in the prior art that by combustion of a fuel it is possible to provide expansion of gases in such manner as to provide movement, for example, of a piston in a cylinder and thus provide a mechanical power output. A variety of engine are known in which gas and air are mixed and then ignited to provide the work function. In others, mixtures of air and gas are compressed before ignition. In all of these engines, it is inherent that the fuel and air be mixed before combustion and a linear motion imparted to a piston in a cylinder then must be again changed to a rotary motion for power takeoff. These engines, generally known as internal combustion engines, require carefully controlled ignition of the fuel and rather complex lubrication systems in view of the high temperatures and rapid reciprocating movements of the parts provided. In addition, the internal combustion engines are most economical when using petroleum products such as gasoline or diesel oil. These fuels will become relatively scarce in the near future and hence will be more expensive.

The present invention, on the contrary, permits the use of any type of gas or liquid fuel, such as hydrogen, propane, oil, methane, alcohol, or indeed any fuel which ignites and burns readily. It is likewise possible to use not only fluid fuels but solid fuels with only slight modifications to be made to handle the solid fuel burning capability in the combustion chamber itself. In internal combustion engines, it is further necessary to provide a great number of exceedingly close tolerance parts so that the cost is high and in many cases the final product is not suitable because of its cost and weight for powering motor cars or the like.

The prior art also has provided a large variety of gas turbine engines. The underlying principle of operation for such engines is to compress the air, to inject the fuel to raise the temperature of the air, and finally to direct the hot air against blades of a turbine to give a rotational mechanical movement and thus perform work. In some cases, separate engines are used for compressing the air, or part of the power developed by the turbine is used for driving a compressor. A problem that arises from turbines is that the hot air being used to impinge against the turbines allows only a limited number of materials to be used in forming the turbine blades because of the high temperatures involved. This makes the turbine engine both expensive and difficult to manufacture.

The present invention will be seen to relate to an engine in which the rotating or other working parts are not subjected to high temperature or pressure nor to the effects of hot expanding gases in such manner as to require expensive and heavy construction engine parts. To the contrary, the fuel is used only to provide a continuous burning in the combustion chamber and to raise the temperature and pressure within the combustion chamber. The pressure in the combustion chamber causes the hot gases to flow into the venturi tubes. This accelerates the gas flow to cause a rapid decrease or pressure within the venturi so that ambient air will flow rapidly through the turbine wheel, into the venturi system and hence back into ambient air. The lowering of pressure in the work function chamber operates with respect to ambient atmosphere to provide a constant, high velocity airstream which performs the work.

BRIEF DESCRIPTION OF THE INVENTION

The present invention will thus be seen to provide a novel engine capable of burning any combustible fuel whether liquid, gas, semi-solid or solid in form. The engine further has the advantage of including only a stationary combustion chamber and one or two associated moving parts, which in the preferred embodiment are both rotating parts. These parts comprise the turbine wheel or wheels used at the inlets or the inlet for the work function chamber. The engine is extremely economical to build and simple in its construction, requiring few precision parts. It is accordingly inexpensive to build, efficient in its operation and inexpensive to operate. It will further be seen that hydrogen is a fuel that offers particular advantages, since the only product of combustion would be water which is easily handled and disposed of.

BRIEF DESCRIPTION OF THE DRAWINGS

Reference is made to the accompanying drawings for an explanation of the present invention and to the several views in which like parts are referred to with like numerals, and wherein:

FIG. 1 is a cross-sectional view with parts broken away showing a schematic view of one form of my invention;

FIG. 2 is a partial sectional view taken along the section line 2—2 of FIG. 1 showing the turbine wheel detail and the arrangement of the venturi in the chamber;

FIG. 2A is a partial perspective view further showing the turbine wheel of FIG. 2;

FIG. 3 is a schematic view in cross section with parts broken away illustrating a critical portion of the invention;

FIG. 4 is a cross-sectional view with parts broken away showing one embodiment of my invention;

FIG. 5 is a cross-sectional view with parts broken away showing an alternate, multiple turbine wheel embodiment of my invention;

FIG. 6 is a cross-sectional view with parts broken away showing a different embodiment of my invention;

FIG. 7 is a cross-sectional view with parts broken away showing a still further embodiment of my invention;

FIG. 8 is a partial section drawing taken along the section line 8—8 of FIG. 7 showing the detail of one portion of the embodiment of FIG. 7;

FIG. 9 is a fragmentary cross-sectional view showing an additional embodiment of my invention somewhat similar to the embodiment shown in FIG. 7;

DETAILED DESCRIPTION OF THE PREFERRED EMBODIMENT

Figure 10:
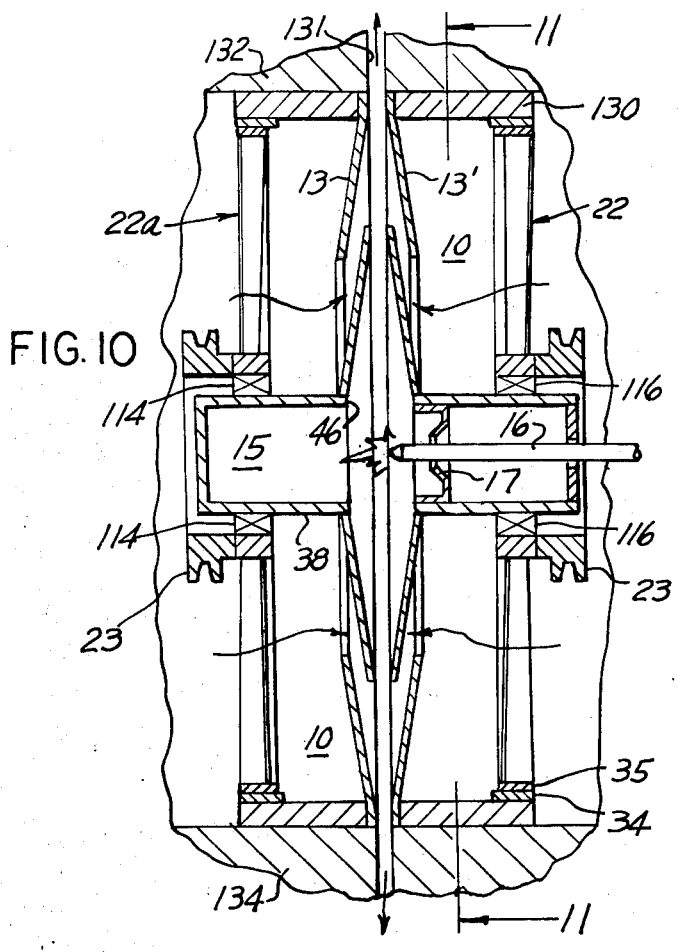
FIG. 10 is a fragmentary view with parts broken away showing a further embodiment of my invention.

With reference to FIG. 1, there is shown the basic construction of an engine using the principles which will now be discussed in detail. It is well known that the air pressure in the ambient atmosphere is 14.7 pounds per square inch. When a fuel is burned in the inner combustion chamber 15 of the work function chamber 10, products of combustion are formed. If these products of combustion are rapidly removed from the combustion chamber 15 by a continuously operating exhaust means, such as venturi 11, then there is a resultant pressure drop in the venturi 11 so that airflow occurs through the blades of the turbine wheel 22. To increase its efficiency, the venturi 11 preferably includes a series of separate venturi stages 11a as shown.

Figure 12:
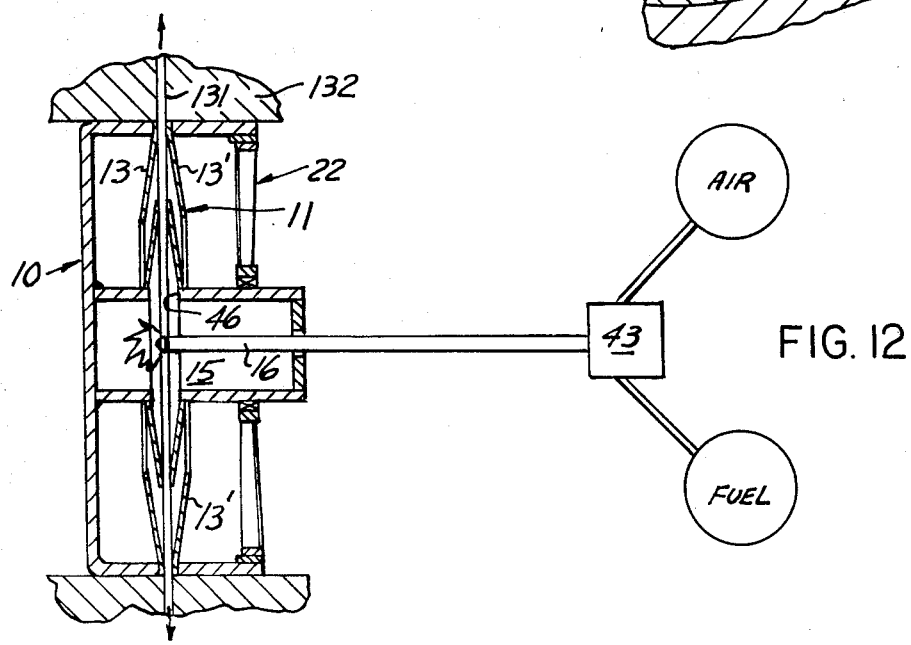
FIG. 12 is a partial sectional and block diagrammatic view showing a different embodiment of my invention.
Figure 13:
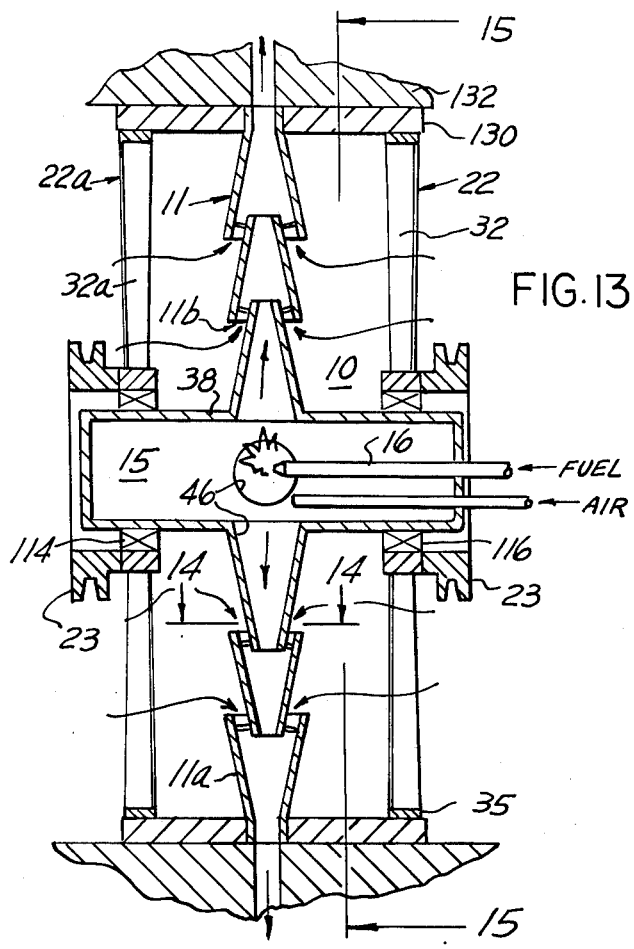
FIG. 13 is a fragmentary cross-sectional view of a further embodiment of my invention.

In operation of the engine, a burner means 16 is mounted in the chamber 10 extending through a shroud 17 so that the combustion of the fuel in the air in the combustion chamber 15 will be begun. Both air and fuel may be admitted to the chamber 15, as shown in FIG. 13 hereinafter, or a premixed air and fuel supply may be provided to the chamber 15, as shown in FIG. 12 hereinafter. As the combustion continues, the products of combustion are continuously removed from the chamber 15 by the venturi 11 and cooling results. A pressure differential will exist as between the pressure of the ambient atmosphere outside the chamber 10 and the pressure at points inside. In order to take advantage of the pressure differential existing between ambient atmosphere and the interior of the chamber 10, a movable work function performing member is embodied as a turbine wheel 22. The turbine wheel 22 is rotatably mounted and coaxial with the inlet 12. The turbine wheel 22 is rotatably mounted on a shaft 24 which further includes a bearing support means at its right hand end for the turbine wheel 22. This support means includes a vertical support 26 and a bearing 28. It will be seen that the shaft 24 and turbine wheel 22 are retained against longitudinal displacement by limits 30 formed at both sides of the bearing 28.

FIGS. 2 and 2A show more clearly the detail of the plurality of radially mounted turbine blades 32 which are part of the turbine wheel 22. These blades are appropriately positioned and shaped to provide for rotative movement of the entire turbine wheel 22 responsive to passage of a high velocity stream of air from outside of the engine into the interior of the work function chamber 10. The shaft 24 is shown in cross section.

In the operation of the engine, there is provided a rapid flow of relatively low temperature gases into the chamber 10 in a left hand direction as shown by the arrows in FIG. 1 and on into the entry passages 11b of the venturi 11. It is important that the only combustion required for the operation of the engine is provided by the fuel burning jet 16 and the heat that is generated in the burning process is rapidly removed from the chamber 15 through the flow of air provided by the exhaust venturi means 11.

FIG. 2A shows a shroud 35 included about the free ends of the blades 32. The shroud 35 extends circumferentially all the distance around the turbine wheel 22 within a seal 34. The shroud 35 has the function of putting "hats" on all the blades 32. This effectively prevents any cross-flow across the tips between the blades 32. Additionally, this makes it easier to provide a close tolerance fit as between the turbine wheel 22 and the seal 34 fitted in the inlet 12 of the chamber 10. Also, it promotes a rigid assembly of the entire group of parts in the turbine wheel 22 and makes it possible to form the entire turbine wheel from a single molding operation. The operating temperatures to which the moving parts are subjected are relatively low. This greatly simplifies the material section for the parts used in the engine itself. These may be of a variety of easily cast or molded materials which are easy to work with and light in weight.

A further schematic showing of my invention is made in the FIG. 3 drawing. The general configuration of the central parts of the engine has been changed in order to improve the arrangement of parts and to promote the efficiency of the engine. In the FIG. 3 drawing, there are provided two vertical supports 27 with associated bearings 36. Mounted on the bearings 36 is a central hollow rotating cylinder 38. The burner or jet 16 is in communiction with a source of mixed fuel and air 42 at the right hand end of the cylinder 38. The burner 16 extends through an opening 44 formed at the right hand end of the cylinder 38. The cylinder 38 further includes a number of openings 46 formed in its periphery. Also included at the left hand end of the cylinder 38 is a power takeoff hub 48 fixed to the cylinder to provide a power takeoff from a belt or like mechanical connecting means. The power takeoff can, of course, be used to power a vehicle, generator or any other device.

FIG. 4 shows a complete turbine engine incorporating the basic features explained in connection with FIG. 3. There is further included between the upright supports 27 a work function chamber 10 mounted at its upper end to a fixed support 50 and at its lower end to a fixed support 52. The work function chamber 10 terminates at its left side in a relatively small sized or restricted end portion 54. Again, the hollow cylinder 38 is mounted between the bearings 36 for free rotative movement. Also, a bearing 46 is included between the left hand restricted end 54 of the chamber 10. In the operation of the embodiment of FIG. 4, the turbine wheel 22 and the cylinder 38 rotate as a unitary assembly while power takeoff is provided at the left hand end of the cylinder by a tub 48. Again, the high velocity stream of air has a flow path as indicated by the arrows between the blades 32 of the turbine 22, into the chamber 10 and finally exiting at the periphery of the chamber 10 through the venturi 11. This exiting flow of air, along with the accompanying removal of the products of combustion and of heat from the combustion chamber 15, is provided by the venturi 11. Fuel and air are passed through tubes 16 and 17, respectively, into the interior of the combustion chamber 15.

It is further important that the work function chamber 10 is large in diameter as compared to its thickness. It is possible to add a plurality of sections of chamber 10, one to the other, each with associated turbine wheel parts to multiply the torque output possible. A further embodiment employing this principle will next be shown in FIG. 5.

FIG. 5 shows an example of a stacked engine in which the basic elements of the engine, namely, the combustion chambers 15, the work function chambers 10 and the associated turbine wheels 22, are multiplied and duplicated in a like manner along the length of the cylinder 38. Thus, the turbine wheels 22 are provided at the same time with a number of converging flows or airstreams as indicated by the arrows from ambient atmosphere and out through the venturi 11. The flow of heated air and the products of combustion occurs outwardly from the cylinder 38, through the openings 46, through the central part of the engine and out under the action of the venturi 11. It will be seen that a double section embodiment of the engine, such as shown in FIG. 5, would give approximately two times the torque output of a single unit. This multiplication of output could be continued by adding a large number of stages, with the number of stages limited only by the practical length for the cylinder 38. To accommodate the necessary combustion for each of the different combustion chambers 15, the jet burner 16 is extended with a plurality of outlets corresponding to each of the associated chambers 15. It will be understood that the fuel source, indicated in FIG. 5 as a constant pressure source 42, may likewise be provided as a pulsed fuel source in which the pressure differential would be periodically increased and decreased as the rate of the combustion process in the chambers 15 is altered.

FIG. 6 shows a different embodiment of the invention which bears some similarity to the FIG. 4 embodiment except that the cylinder 38 is retained in place in the work function chamber 10 in a stationary position. In the embodiment of FIG. 6, the turbine wheel 22 is mounted for rotation with a stub shaft 24 about the stationary cylinder 38 on a first bearing 100 and a second bearing 102. The bearing 102 in turn is fixed to a vertical support 104 shown in part at the right hand side of the drawing. Thus, the turbine wheel 22 with its supporting stub shaft 24 rotates in a unitary fashion to provide a power takeoff through a driven belt 106 engaging a pulley 108 at the right hand end of the stub shaft 24. In a like manner to the FIG. 4 embodiment, the path of the high velocity airstream is indicated by arrows, with the impinging air passing against and between the individual blades 32 of the turbine wheel 22. Upper and lower fixed supports 50 are used to retain the work function chamber 10 in place. A multiple stage venturi 11 is used as the exhaust means in the work function chamber 10. A burner 16, in communication with a source of fuel 42, extends into the central part of the cylindrical member 38 which functions as a combustion chamber 15 so that combustion is continued, with the heated products of combustion flowing from the central part of the cylinder 38 and thence outwardly toward ends of the venturi extending through the periphery of the chamber 10.

FIG. 7 shows a further embodiment of my invention in which the work function chamber 10 has its side walls effectively formed by a pair of turbine wheels 22 and 22a, which are opposed one to the other and joined at their tips by a shroud 110. The shroud 110 extends circumferentially about both of the turbine wheels 22, 22a. A circular guideway 112 is used to protect the outer surface of the shroud 110 from interference with other objects. The venturi 11 are fixed at their outer ends to the shroud 110.

In the FIG. 7 embodiment, the central hollow cylinder 38 is stationary and a set of bearings 114, 116 are used to provide a rotative mounting for the turbine wheels 22, 22a around the cylinder 38. Airflow is provided against and between the blades 32a and 32 of the respective turbine wheels as shown by the arrows. A power takeoff hub 23 is connected to the left hand end of the turbine wheel 22a.

As better shown in FIG. 8, the blades 32a of the turbine wheel 22a are given a reverse twist and orientation as compared to the blades 32 of the turbine wheel 22 already shown in greater detail in FIG. 2A. Thus, the force of the air passing into driving contact with the turbine wheels 22, 22a will be such as to rotate both of the pair of turbine wheels and their assembly in a like clockwise direction. The dual turbine assembly provides an effective doubling of the torque output as compared to the engines shown, for example, in FIGS. 4 or 6.

FIG. 9 shows a still different embodiment of my invention which is somewhat similar to the embodiment shown in FIG. 7 with respect to the inclusion of a double turbine wheel assembly including turbine wheels 22 and 22a. However, in the FIG. 9 embodiment, the two turbine wheels 22, 22a include blades 32 and 32a, respectively, which are fixed to hubs, thus forming integral parts of the central cylinder 38. The cylinder 38 is supported at its left and right hand ends between vertical supports 120, 122, with bearings 121, 123 interposed to provide a free rotation of the cylinder 38. The burner 16 is connected to an oxidized fuel source 42 and extends into the central opening of the cylinder 38 to provide combustion. The products of combustion then pass through the openings 46 formed in the cylinder 38 and finally outwardly through the outer open ends of the venturi 11.

Figure 11:
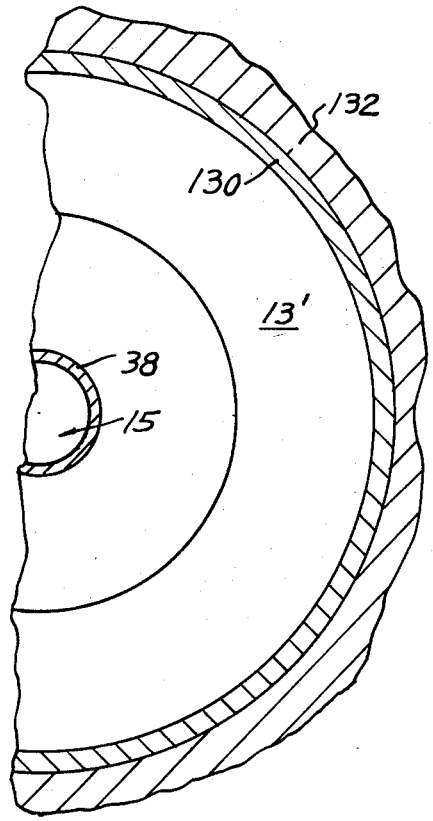
FIG. 11 is a sectional view along the section line 11—11 of FIG. 10.

FIGS. 10 and 11 show a further modification of my invention in which a pair of turbine wheels 22 and 22a are utilized. In an arrangement generally similar to that shown in FIG. 7, the cylinder 38 is mounted in a stationary position and the turbine wheels are rotatively mounted about it on a set of bearings 114, 116. A work function chamber 10 is effectively formed between the turbine wheels and an outer fixed ring 130 which is held between upper and lower supports 132, 134. The venturi 11 is fabricated from one or more pairs of opposed, shaped plates, 13, 13' that are fixed at their opposed outer ends to a peripheral opening 131 formed in the ring 130. This provides a continuous circumferential venturi about the periphery of the ring 130 in communication between the central part of the combustion chamber 15 and ambient. The path of the products of combustion is thus outwardly from the burner 16, through the central opening 46 formed in the cylinder 38 and out from the openings 131 of the venturi 11. Power takeoff hubs 23 are provided for each turbine wheel 22a, 22. It will be understood that the turbine wheels may alternately be mounted on a common shaft with a single power takeoff provided.

FIG. 12 shows a similar arrangement to that of FIG. 10 except that a single turbine wheel 22 is included. Separate sources of air and fluid fuel are mixed in a mixing device, such as a carburetor 43, before burning is carried on in the combustion chamber 15. The combustion chamber 15 will be seen to be closed except for the opening 46 at the inner ends of the venturi 11.

Figure 14:
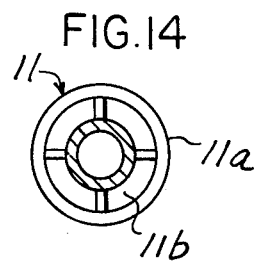
FIG. 14 is a sectional view taken along the section line 14—14 of FIG. 13 showing the construction of one of the venturi.
Figure 15:
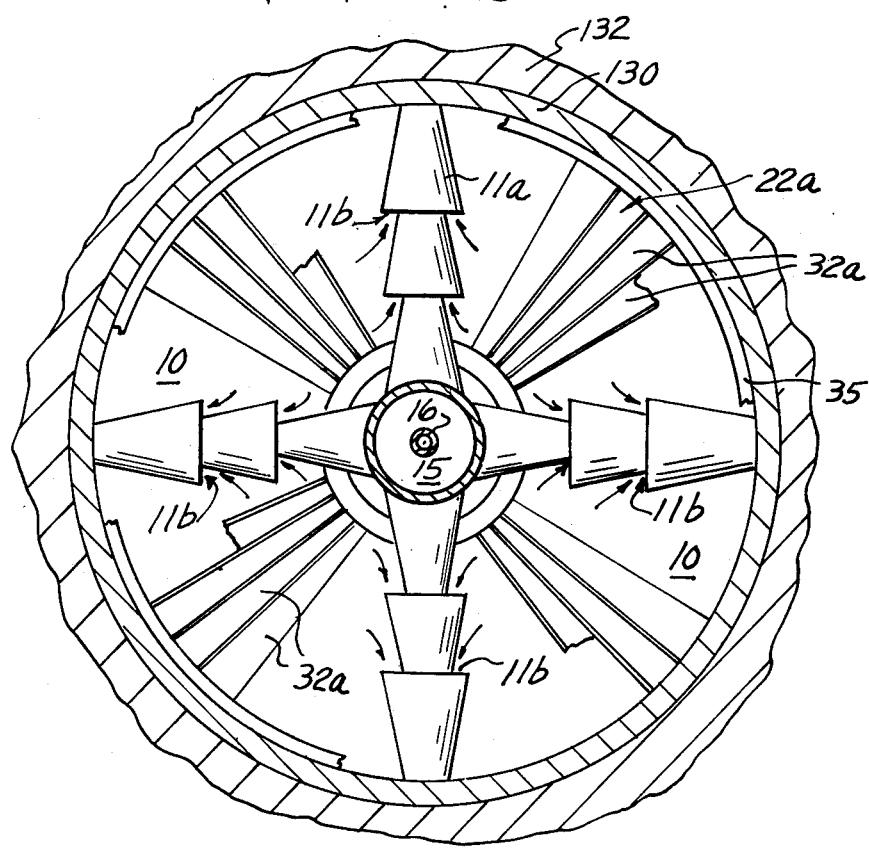
FIG. 15 is a sectional view along the section line 15—15 of FIG. 13.

FIGS. 13, 14 and 15 show a still further embodiment of my invention, again with a double turbine arrangement of turbine wheels 22a and 22. The two turbine wheels are mounted for rotation about the cylinder 38 on bearings 114 and 116, respectively. The venturi 11 in the FIG. 13 embodiment is fixed directly and with a closed connection to the cylinder 38 so that the heated products of combustion enter the venturi near the central part of the work function chamber 10. An exit from the venturi 11 is formed through the periphery of the ring 130 and out through an opening provided in support 132. Other points of entry to the venturi 11 are provided along its length at entry passages 11b for the airflow occurring from ambient air through the turbine wheels 22, 22a as shown by arrow. It will be understood that the venturi 11 may be fabricated from a single pipe structure of by joining a plurality of separate sections, such as illustrated in FIG. 14, each properly shaped to provide venturi operation.

Figure 17:
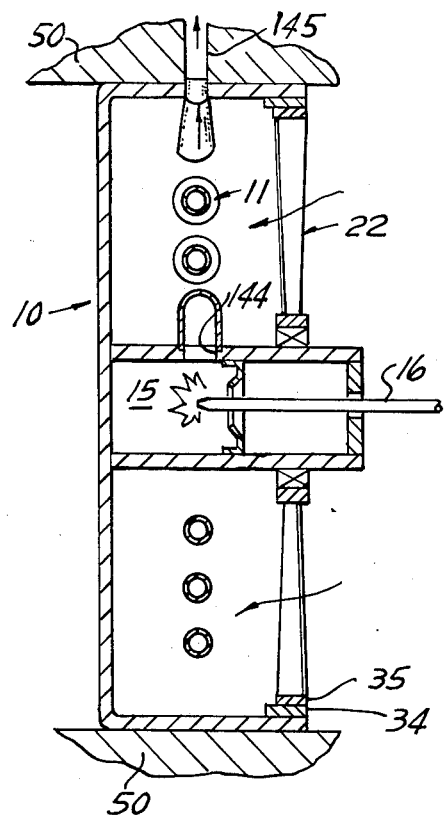
FIG. 17 is a sectional view taken along the section line 17—17 of FIG. 16.
Figure 16:
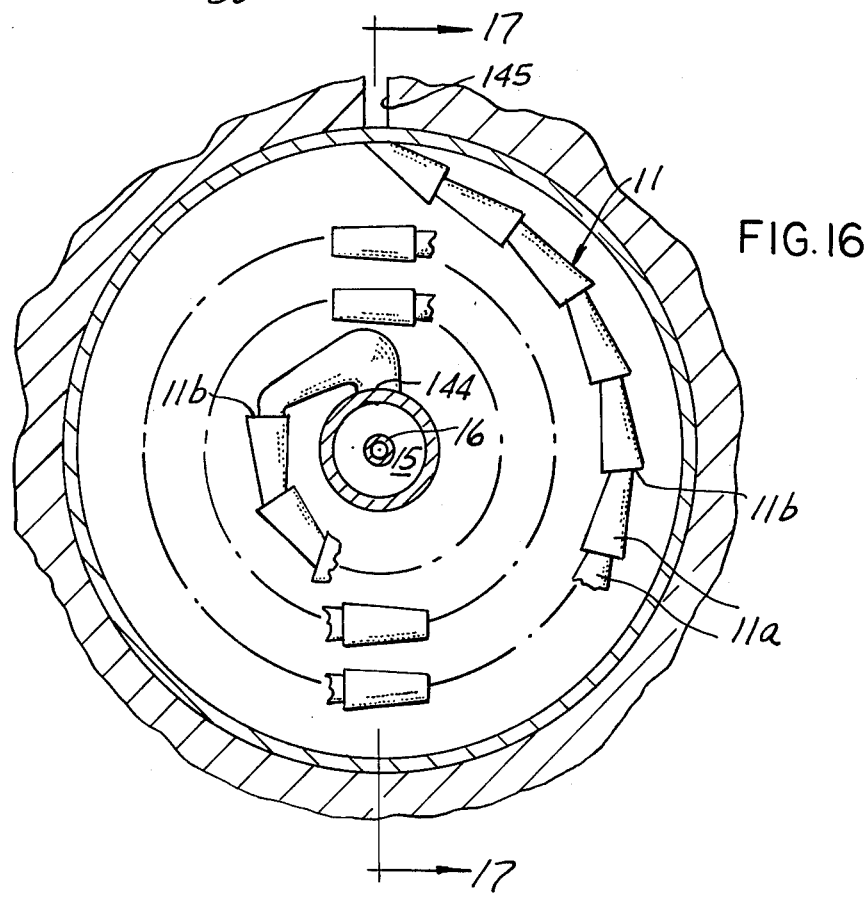
FIG. 16 is a partial sectional view showing a still different form of my invention.

FIGS. 16 and 17 show a still different form of my invention with respect to the type of venturi 11 used. The venturi 11 is is the form of a continuous, multiple venturi tube with its inner end 144 in direct communication with the interior of the combustion chamber 15. The outer end 145 is in communication with ambient air. The number of venturi entry passages or points 11b is greatly increased by this coiled arrangement of multiple stage venturi 11 and thus the efficiency of the engine is substantially improved. In a like manner to the other forms of my invention shown, combustion is maintained in the combustion chamber through the burning of a mixture of air and fuel.

It will thus be seen that I have provided by my invention an engine which is greatly simplified with respect to its moving parts. The requirements for lubrication are greatly reduced. The engine further is capable of burning any type of fuel, whether liquid, gas or solid, so long as it can be continuously fed to and burned in the combustion chamber. The moving parts themselves are not subjected to high temperatures or large compressive forces so that they may be made of relatively low strength, easily formed, inexpensive and durable parts.

What is claimed is:

1. An engine comprising:
means defining a work function chamber, said work function chamber having an inlet formed in one side thereof;
means defining a combustion chamber said combustion chamber mounted inside said work function chamber;
a burner means extending into said combustion chamber for combustion;
a movable work function performing member rotatably mounted in the inlet of said work function chamber, said member having one side in communication with the interior of said work function chamber and the other side in communication with ambient air;
a means mounted in said work function chamber and communicating between said combustion chamber and ambient for facilitating the removal and cooling of the products of combustion from said combustion chamber to ambient and for reducing the pressure inside said work function chamber below ambient, thereby subjecting said member to movement responsive to pressure differential between its two sides;
said last mentioned means comprising a series of venturi stages extending through said work function chamber.

2. A turbine engine comprising:
means defining a work function chamber, said chamber having an inlet of circular configuration;
means defining a combustion chamber, said combustion chamber mounted inside said work function chamber;
a burner means extending into said combustion chamber for combustion;
an exhaust means mounted in said work function chamber and communicating between said combustion chamber and ambient for cooling and removing the products of combustion from said combustion chamber and to reduce conjointly the pressure in said work function chamber;
a turbine wheel having a plurality of radially arrayed blades therein and a shroud circumferentially extending around the blades, said wheel aligned inside said inlet; and
a shaft, said turbine wheel rotatably mounted on said shaft in said inlet and of substantially the same size as said inlet, said turbine wheel driven in a rotative manner responsive to passage of flow of air between said blades resultant to pressure differential between ambient atmosphere and the reduced work function chamber pressure;
said exhaust means comprising a series of venturi stages extending through the work function chamber and communicating between the interior of said combustion chamber and ambient air.

3. An engine comprising:
means defining a work function chamber, said chamber having an inlet;
means defining a combustion chamber, said combustion chamber mounted adjacent to and in communication with said work function chamber;
a burner means extending into said combustion chamber for combustion therein;
a movable work function performing member mounted in the inlet of said work function chamber, said member having at least one side in communication with the interior of said work function chamber and the other side in communication with ambient air; and
a series of venturi stages connected from said combustion chamber to ambient for cooling and removing the products of combustion from such chamber, and for reducing the pressure in said work function chamber and thus subjecting said member to movement responsive to pressure differential between its two sides,
said combustion chamber comprising a central chamber of a hollow cylindrical shaft and the work function chamber comprising a chamber formed between a pair of turbine wheels, said wheels mounted on said hollow cylindrical shaft and having their blades oppositely inclined to provide rotation of the pair in a common direction relative to said shaft.

4. The combination as set forth in claim 3 wherein said shaft includes a plurality of openings formed about its periphery intermediate its ends and in communication through said openings with the work function chamber part formed between the blades of the two turbine wheels.

5. The combination as set forth in claim 3 wherein said venturi means is stationary and fixed at its outer open end to said work function chamber wall.

6. The combination as set forth in claim 3 wherein said venturi means is operably connected to said shaft and said wheels and rotatable along therewith.

7. The combination as set forth in claim 4 wherein said burner means comprises a flame jet extending into said combustion chamber in the central part of said cylinder proximate said openings therein.

8. An engine comprising:
means defining a combustion chamber and comprising a hollow central cylinder having a plurality of openings, formed therein intermediate its ends;
a shroud;
a pair of like size turbine wheels spaced one from the other, coupled together by said shroud and rotatably mounted about said cylinder each at a different side of said openings, said turbine wheels substantially larger in diameter than said cylinder, said turbine wheels having oppositely disposed blades in each relative to the other such as to provide a common direction rotative force to said turbines about said cylinder responsive to differential of pressure between ambient atmosphere and a work function chamber defined between said turbine wheels;
a burner means coupled to a source of fuel and extending into said cylinder for combustion;
an exhaust means positioned intermediate said cylinder and said shroud for evacuating the products of combustion from said cylinder; and
a power take-off means operatively connected to said turbine wheels, said exhaust means comprising a series of venturi stages.

9. The combination as set forth in claim 8 wherein said venturi means comprises a plurality of radially arrayed, multiple stage and multiple entry venturi tubes.

10. The combination as set forth in claim 8 wherein said venturi means is operably coupled to said shroud for rotation along therewith.

11. The combination as set forth in claim 8 wherein said venturi means comprises a substantially continuous venturi element extending peripherally about said shroud.

12. An engine comprising:
a pair of turbine wheels spaced one from the other, coupled and mounted in a rotative manner;
a cylindrical ring extending about and enclosing the peripheries of said wheels and defining a work function chamber therebetween;
means defining a combustion chamber, said combustion chamber centrally positioned inside said work function chamber;
a burner means coupled to a source of fuel and extending into said combustion chamber for burning;
an exhaust means comprising a series of venturi stages communicating between said combustion chamber and an opening formed through said ring for continuously evacuating the products of combustion therefrom and lowering pressure in said work function chamber; and
a power take-off means operably connected to said turbine wheel.

13. The combination as set forth in claim 12 wherein said series of venturi stages comprise a plurality of multiple stage venturi tubes radially extending through said work function chamber.

14. The combination as set forth in claim 12 wherein said venturi stages are fixed to said ring in a stationary position relative to said turbine wheels.

15. The combination as set forth in claim 12 wherein said ring and said turbine wheels are coupled together for conjoint rotation, the last of said venturi stages further connected at its outer open end to said ring.

16. The combination as set forth in claim 12 wherein said venturi stages comprises a substantially continuous venturi passage extending peripherally around said ring in communication with ambient.

17. The combination as set forth in claim 12 wherein said source of fuel comprises hydrogen gas.

18. The combination as set forth in claim 12 wherein said turbine wheels are mounted for conjoint rotation.

19. The combination as set forth in claim 12 wherein said turbine wheels are separately mounted for independent rotation, each with a separate power takeoff means associated with it.

20. An engine comprising:
means defining a closed combustion chamber and comprising a hollow cylinder;
a bearing means for mounting said cylinder for rotation.
a pair of turbine wheels fixed to said cylinder for rotation therewith, said turbine wheels having their blades oppositely disposed one relative to the other to provide rotation in a common direction responsive to passage of air therethrough;
a shroud extending circumferentially about the periphery of the blades of both of said wheels to define a work function chamber therebetween;
a burner means extending into said cylinder for combustion therein, said cylinder having a plurality of openings formed about its periphery;
a series of staged venturis in communication with said cylinder openings and extending through the work function chamber for removing the products of combustion from said openings and communicating through an opening formed in said shroud to ambient air; and
a power take-off means operably connected to said cylinder.

21. The combination as set forth in claim 20 wherein said series of staged venturis comprise a serially connected plurality of venturi stages extending from said cylinder in a radial array.

22. The combination as set forth in claim 20 wherein said burner means is of the continuous burning gaseous type.

23. The combination as set forth in claim 20 in which a source of hydrogen gas is coupled to said burner means.

24. The combination as set forth in claim 20 in which said series of staged venturis comprise a multiple stage venturi tube arrayed in a continuous coil with its outer end extending through said shroud opening.

25. An engine comprising:
means defining a first chamber;
a turbine wheel mounted for rotation in said chamber, said turbine wheel having one side in communication with ambient air and the other in communication with the interior of said chamber; and
means operably connected in said first chamber for reducing the pressure level thereof to a magnitude below ambient pressure level whereby the resultant airflow between ambient and such chamber effects the driven rotation of such turbine wheel;
said first chamber further including a combustion chamber mounted therein and having a burner means, said pressure reducing means comprising a series of staged venturies communicating between said combustion chamber and ambient and extending through said first chamber;
said staged venturis extending radially in a plurality of branches from said combustion chamber to ambient.

* * * * *

UNITED STATES PATENT AND TRADEMARK OFFICE
CERTIFICATE OF CORRECTION

PATENT NO. : 4,048,798

DATED : Sept. 20, 1977

INVENTOR(S) : John S. Larkins, Jr.

It is certified that error appears in the above-identified patent and that said Letters Patent are hereby corrected as shown below:

Col. 2, line 2, following "chamber." insert --Air delivery to the chamber is pressurized as well known in the art.--

Col. 4, line 18, change "section" to --selection--

Col. 4, line 54, change "tub" to --hub--

Signed and Sealed this

Seventh Day of March 1978

[SEAL]

Attest:

RUTH C. MASON
Attesting Officer

LUTRELLE F. PARKER
Acting Commissioner of Patents and Trademarks